United States Patent [19]

Tarrer et al.

[11] 4,374,016

[45] Feb. 15, 1983

[54] PROCESS FOR HYDROGENATING COAL AND COAL SOLVENTS

[75] Inventors: Arthur R. Tarrer; Ketan G. Shridharani, both of Auburn, Ala.

[73] Assignee: Air Products and Chemicals, Inc., Allentown, Pa.

[21] Appl. No.: 295,896

[22] Filed: Aug. 24, 1981

[51] Int. Cl.³ .......................... C10G 1/06; C10G 1/00
[52] U.S. Cl. ..................................... 208/10; 208/8 LE
[58] Field of Search ................................ 208/8 LE, 10

[56] References Cited

U.S. PATENT DOCUMENTS

| | | | |
|---|---|---|---|
| 42,898 | 5/1864 | Cleland . | |
| 2,127,383 | 8/1938 | Pier et al. | 196/52 |
| 2,361,825 | 10/1944 | Doumani | 23/226 |
| 2,402,683 | 6/1946 | Signaigo | 252/228.4 |
| 2,402,684 | 6/1946 | Signaigo | 252/228.4 |
| 3,505,204 | 4/1970 | Hoffman | 208/10 |
| 3,514,394 | 5/1970 | Wilson et al. | 208/10 |
| 3,607,719 | 9/1971 | Johnson | 208/10 |
| 3,671,418 | 6/1972 | Gatsis | 208/10 |
| 3,884,795 | 5/1975 | Wright et al. | 208/8 |
| 3,884,796 | 5/1975 | Hinderliter et al. | 208/10 X |
| 4,077,866 | 3/1978 | Owen et al. | 208/8 LE X |
| 4,189,371 | 2/1980 | Maa et al. | 208/8 |
| 4,219,403 | 8/1980 | Nokoko et al. | 208/10 |
| 4,314,898 | 2/1982 | Nokoko et al. | 208/8 LE |

OTHER PUBLICATIONS

Chemical Abstracts, vol. 14, 24, 46, 47, 55, 53, 58, 60, 69, 71, 72, 82, 87, 91.
J. W. Mellor, Inorganic and Theoretical Chemistry, Jul. 1935, pp. 143 and 144.
Guin, Tarrer, Prather, Johnson, Lee, Effects PF Coal Minerals on the Hydrogenation, Desulfurization, and Solvent Extraction of Coal, Nov. 28, 1977.

*Primary Examiner*—Delbert E. Gantz
*Assistant Examiner*—William G. Wright
*Attorney, Agent, or Firm*—Geoffrey L. Chase; E. Eugene Innis; James C. Simmons

[57] ABSTRACT

A novel process is described for the hydrogenation of coal by the hydrogenation of a solvent for the coal in which the hydrogenation of the coal solvent is conducted in the presence of a solvent hydrogenation catalyst of increased activity, wherein the hydrogenation catalyst is produced by reacting ferric oxide with hydrogen sulfide at a temperature range of 260° C. to 315° C. in an inert atmosphere to produce an iron sulfide hydrogenation catalyst for the solvent. Optimally, the reaction temperature is 275° C. Alternately, the reaction can be conducted in a hydrogen atmosphere at 350° C.

6 Claims, No Drawings

PROCESS FOR HYDROGENATING COAL AND COAL SOLVENTS

TECHNICAL FIELD

The government of the United States of America has rights in this invention pursuant to Contract No. DE-AC22-79ET14806 awarded by the U.S. Department of Energy.

This invention relates to the process for hydrogenating coal and coal solvents in order to recover low molecular weight hydrocarbons. More particularly this invention relates to a method of hydrogenating coal by first hydrogenating a solvent used in the solvent refining of coal. The hydrogenated solvent then donates its hydrogen to the coal material to complete the hydrogenation process. This invention is directed to improved catalysis of this hydrogenation process.

BACKGROUND OF THE PRIOR ART

The conversion of coal from a solid hydrogen deficient aromatic based material to a hydrogenated hydrocarbon of low molecular weight has been considered desirable for a long period of time because of the dwindling supplies of petroleum based hydrocarbons in this country and around the world and because of the large reserves of coal known to exist within this country. A process for the conversion of coal solids to liquid hydrocarbons, such as gasoline, would be extremely beneficial. Various methods for the conversion of coal to hydrocarbons have been suggested by the prior art including the direct conversion of coal by catalytic action and the solvent refining of coal by combined solvent and catalytic action.

This invention is directed to a coal conversion process of the latter type, namely a solvent refined coal recovery process. Particularly, the process involves the production of a catalyst for the hydrogenation of the solvent used in the coal conversion wherein the hydrogenation catalyst is of enhanced activity, of low cost and of no detriment to the depleted coal ash.

The prior art has recognized that metal sulfides have catalytic activity with respect to the hydrogenation of carbonaceous materials. A process for producing metal sulfides by the reaction of a metal or metal compound with hydrogen sulfide in the absence of hydrogen or oxygen atmospheres at a temperature range of 150° to 700° C. has been described in U.S. Pat. No. 2,127,383. Iron sulfides are contemplated in this patent, although they are not the preferred catalyst. The preferred reaction temperature ranges between 300° C. and 600° C.

Other attempts have been made to produce active hydrogenation catalysts from the reaction of metal oxides with hydrogen sulfide. Particularly, the reaction of iron oxides with hydrogen sulfide at a temperature range of 100° C. to about 500° C. is disclosed in U.S. Pat. No. 2,361,825. This patent is confined to the reduction of sulfur dioxide with hydrogen in the presence of the recited catalysts and does not contemplate carbonaceous material being hydrogenated.

It has been recognized that hydrogenation catalysts for coal are found in-situ in coal as a coal mineral impurity. Various metals and minerals are known to exist in coal, and at least some of these minerals, such as iron sulfide, have been reported to have activity in the conversion or hydrogenation of coal. Exemplary of such teachings is the article by Guin et al., "Effects of Coal Minerals on the Hydrogenation, Desulfurization and Solvent Extraction of Coal", Industrial Engineering Chemistry Process Design Development, Volume No. 2, 1978. This article identifies the mechanism by which coal solids are hydrogenated wherein a coal-derived solvent is first hydrogenated and the hydrogenated solvent then acts as a donor to provide hydrogen to the coal solids themselves. The hydrogenation of creosote oil as a solvent in a solvent refined coal process is specifically contemplated.

These prior art teachings identify the known catalytic effect of minerals and particularly iron sulfide in the hydrogenation of carbonaceous materials, such as coal and coal-derived solvents, to produce hydrocarbons similar to cracked petroleum products. However, the art does not disclose the surprising heightened catalytic activity of iron sulfide which is produced by a method wherein the temperature is confined to the range of 260° C. to 315° C. in a nonoxidizing atmosphere, or more specifically an optimal temperature of 275° C. It is an object of the present invention to provide such a heightened active catalyst by a novel process which is incorporated into the hydrogenation process of a solvent refined coal production method.

It is a further object of present invention to provide such a process for the production of a hydrogenation catalyst of iron sulfide wherein the temperature is optimally maintained at 275° C. during the catalyst preparation reaction period and the reaction is conducted in the absence of $H_2$.

It is yet another object to provide a process wherein a hydrogen atmosphere exists during the catalyst preparation wherein the temperature is maintained at 350° C.

BRIEF SUMMARY OF THE INVENTION

The present invention provides a process for the hydrogenation of coal and coal liquids in order to provide liquefaction of the solid coal and upgrading of the coal liquids. The process involves the solvent refining of coal wherein the solvent normally constitutes a species of the constituents of the solid coal. The hydrogenation of the coal usually takes place in a two-step sequence in which the coal solvent is first hydrogenated and the hydrogenated coal solvent, in turn, hydrogenates the coal solids. The hydrogenation of the coal solvent is catalyzed, and the improvement of the present invention provides a solvent hydrogenation process wherein a catalyst of increased activity is provided by the reaction of ferric oxide and hydrogen sulfide in a non-oxidizing, atmosphere at a temperature in the range of 260° C. to 315° C.

Preferably, the production of the hydrogenation catalyst for the coal hydrogenation process is conducted at a temperature of 275° C.

Preferably the catalyst production process is conducted in the absence of hydrogen.

Additionally, the catalyst should be stored in an inert atmosphere, free of oxidizing agents, prior to its utilization in the hydrogenation process.

Alternately, the catalyst can be prepared in the presence of hydrogen at a temperature of 350° C.

DETAILED DESCRIPTION OF THE INVENTION

The recovery of lower molecular weight hydrocarbons from coal solids and coal liquids involves the conversion of the organic constituents of the coal by chemical process. The organic constituents of coal chiefly comprise polynuclear aromatic ring compounds. The polynuclear ring compounds generally are 2, 3 and 4-ring structures joined or polymerized by oxygen and sulfur bridges. It is the object of solvent refining to derive liquefied, solvated or suspended hydrogenated hydrocarbons from these solid aromatic organic sources in the coal. In order to convert or depolymerize the cyclic, polynuclear aromatic coal compounds, the compounds are subjected to hydrogenation reaction conditions. The hydrogenation reaction is best performed in a fluid or liquid environment in order to facilitate contact of the solid, particulate coal compounds with the hydrogenated solvent and removal of those compounds which have been depolymerized or derived by the hydrogenation process.

Therefore, a solvent refining process is used to reduce the cyclic aromatic compounds in the coal to cyclic and non-cyclic, hydrogenated hydrocarbons. The solvent allows for the intimate contact of the coal solids with the hydrogenation source, as well as providing a medium or vehicle by which the derived or cracked compounds from the coal solids are removed from the vicinity of the solid coal particles being processed. It is beneficial to select a coal solvent which resembles or is related to the materials to be derived from the coal solids. This obviates the need for a complex separation of the derived products of the coal solids from the solvent medium. Various solvents have been utilized in the solvent refining of coal, including toluene, naphthalene, biphenyl, methylnaphthalene and creosote, as well as the hydrogenated species decalin, and tetralin.

Although the process for solvent refining of coal will be set forth briefly hereinafter, we do not wish to confine ourselves to one particular description, and therefore, we specifically incorporate herein by reference additional descriptions of the solvent refining of coal which will operate equally well with the solvent catalyst preparation method of the present invention, particularly; U.S. Pat. No. 3,884,795 and U.S. Pat. No. 4,189,371.

The solvent refining or extraction of coal solids is conducted by the contact of an hydrogenated extraction solvent on finely divided coal or other particulate carbonaceous material in an environment of hydrogen gas. This reducing atmosphere hydrogenates and liquifies or depolymerizes the carbonaceous solids of the coal which thereafter become solvated or suspended in the solvent and can be removed from the remaining coal solids or ash for further extraction from the now hydrogen-depleted solvent. This process is enhanced by hydrogenation catalysts. Various expensive hydrogenation catalysts are known for use in coal liquefaction, including palladium, tin, nickel, molybdenum, tungsten and cobalt. These catalysts are used in combinations and can be mounted on alumina carriers. Such catalysts are expensive initially and suffer from process problems in reprocessing or recovery after the catalyst is spoiled by carbonization. Therefore, desirable attributes of a coal liquefaction or hydrogenation catalyst would be inexpensive availability as well as relative abundance. A desirable catalyst should also not impair the coal ash upon which it will contact to avoid problems with the further processing of the coal ash after hydrogenation and liquefaction of the organic portions of coal. The present iron sulfide catalysts meet such criteria.

The process of this invention is described with reference to the liquefaction and hydrogenation of bituminous coal. However, the invention is deemed to be applicable to the solvent refining of, not only bituminous coal, but other solid carbonaceous materials, such as sub-bituminous coal, lignite and oil shales.

The catalysts utilized in the solvent refined coal hydrogenation and liquefaction process of the present invention are produced by the reaction of iron oxides with hydrogen sulfide. This reaction produces an iron sulfide which has been shown to have increased catalytic activity in the hydrogenation of coal solvents. In turn, these coal solvents are utilized to hydrogenate coal solids and effect the liquefaction and recovery of hydrocarbons from the coal.

In actual practice, the catalyst and the hydrogenation solvent are contacted in a reaction vessel and the catalyzed reaction of the hydrogenation of the solvent occurs during this initial contact stage. The hydrogen-rich solvent, usually referred to as the hydrogen-donor solvent, then donates or gives up its hydrogen to the particulate coal solids. The hydrogen from the solvent hydrogenates the susceptible carbonaceous compounds of the coal solids in either the same stage as the catalyzed hydrogenation of the solvent or in a second stage. The hydrogenation reaction breaks bonds, such as oxygen and sulfur bridging bonds between cyclic aromatic groups, which hold the carbonaceous material in the solid matrix of the particulate coal. The hydrogenated compounds are solvated by the now hydrogen-depleted solvent. The hydrogenated coal liquids and the hydrogen-depleted solvent are separated or filtered from the remaining coal solid or ash and further processed to extract the coal liquids from the solvent. The extraction can be done by any number of methods known in the art, such as fractionation or if the solvent is a species of the coal liquids a portion of the liquid is merely removed as product. The solvent refining of solid coal can be performed in a continuous or batch mode. The continuous mode is preferred. Optimally, the coal hydrogenated occurs in a hydrogen atmosphere.

In light of the fact that hydrogenation of coal solids occurs predominantly by the initial hydrogenation of the solvent used in the solvent refining of coal, and then by the subsequent hydrogenation of the coal solids, and that this initial solvent hydrogenation is the rate determining step in the solvent refining process for coal solids, the preferred catalysts of the present invention have been analyzed for their increased effect in the coal hydrogenation reaction by testing the catalysts in a conversion reaction involving only the solvent to be utilized in the coal solvent refining. As stated before, various solvents related to the makeup of coal may be utilized and in the examples of the present invention, naphthalene was the selected solvent. The conversion of naphthalene to tetralin and other hydrogenated species gives an indication of the particular catalyst effect on hydrogenation of such solvent, which, in turn, gives as indication of the expected behavior in the coal-solvent refining system.

In the following examples, the specific methods used to prepare the catalyst of the subject invention and the manner in which the tests of these catalyst materials were conducted are given as tabulated in Table 1.

TABLE 1

| Example No. | Material | Surface Area m²/g | Treat Temperature °C | $H_2S$ Flow cc/min | T/N* ratio |
|---|---|---|---|---|---|
| 1 | $Fe_2O_3/H_2S/H_2$ | 5.34 | 350° | 6 | 0.87 |
| 2 | $Fe_2O_3/H_2S/H_2$ | 3.10 | 410 | 6 | 0.31 |
| 3 | $FeS_2/H_2$ | 1.44 | 410 | — | 0.56 |
| 4 | $FeS_2/H_2$ | 1.56 | 410 | — | 0.19 |
| 5 | $Fe_2O_3/H_2S/H_2$ | 2.34 | — | 6 | 0.38 |
| 6 | $Fe_2O_3/H_2S/H_2$ | 2.28 | — | 6 | 0.27 |
| 7 | $Fe_2O_3/H_2S/H_2$ | 2.60 | 460 | 3 | 0.10 |
| 8 | $Fe_2O_3/H_2S/H_2$ | 2.35 | 452 | 12 | 0.52 |
| 9 | $Fe_2O_3/H_2S/H_2$ | 1.57 | 554 | 6 | 0.18 |
| 10 | $Fe_2O_3/H_2S/H_2$ | 3.85 | 410 | 6 | 1.06 |
| 11 | $Fe_2O_3/H_2S/H_2$ | 4.18 | 397 | 6 | 1.30 |
| 12 | $Fe_2O_3/H_2S/H_2$ | 4.95 | 385 | 6 | 0.37 |
| 13 | $Fe_2O_3/H_2S/H_2$ | 4.98 | 392 | 10 | 0.40 |
| 14 | $Fe_2O_3/H_2S/H_2$ | 3.48 | 421 | 10 | 0.58 |
| 15 | $Fe_2O_3/H_2S/H_2$ | 5.57 | 350 | 10 | 3.14 |
| 16 | $Fe_2O_3/H_2S/H_2$ | 3.47 | 430 | 6 | 1.15 |
| 17 | $Fe_2O_3/H_2S/H_2$ | 5.57 | 350 | Air | 0.98 |
| 18 | $Fe_2O_3/H_2S$ | — | 285 | 6 no $H_2$ | 3.60 |
| 19 | $Fe_2O_3/H_2S$ | — | 275 | 6 no $H_2$ | 6.95 |
| 20 | $Fe_2O_3/H_2S$ | — | 275 | 6 no $H_2$ | 7.73 |
| 21 | $FeCl_2/(NH_4)_2S$ | 11.8 | — | — | 0.02 |
| 22 | $Fe_2O_3$ | 11.3 | — | — | 0.06 |
| 23 | $FeS_2$ | 0.02 | — | — | 0.18 |
| 24 | $Fe_2O_3/H_2S$ | — | 275 | 10 no $H_2$ | 7.84 |
| 25 | $Fe_2O_3/H_2S$ | — | 275 | 10 no $H_2$ | 9.13 |
| 26 | $Fe_2O_3/H_2S$ | — | 210 | 10 no $H_2$ | 3.76 |
| 27 | $Fe_2O_3/H_2S$ | — | 125 | 10 no $H_2$ | 2.43 |
| 28 | $Fe_2O_3/H_2S$ | — | 275 | 10 no $H_2$ | 8.49 |
| 29 | $Fe_2O_3/H_2S$ | — | 350 | 10 no $H_2$ | 6.19 |
| 30 | $Fe_2O_3/H_2S$ | — | 425 | 10 no $H_2$ | 4.84 |
| 31 | $Fe_2O_3/H_2S$ | — | 500 | 10 no $H_2$ | 3.79 |
| 32 | $Fe_2O_3/H_2S/H_2$ | — | 135 | 6 | 0.08 |
| 33 | $Fe_2O_3/H_2S/H_2$ | — | 211 | 6 | 0.30 |
| 34 | $Fe_2O_3/H_2S/H_2$ | — | 275 | 6 | 0.42 |
| 35 | $Fe_2O_3/H_2S/H_2$ | — | 350 | 6 | 3.13 |
| 36 | $Fe_2O_3/H_2S/H_2$ | — | 430 | 6 | 1.15 |
| 37 | $Fe_2O_3/H_2S/H_2$ | — | 550 | 6 | 0.18 |

*The T/N ratio is the ratio of tetralin, which is produced from the initial quantity of naphthalene present before the reaction, to the remaining naphthalene quantity and this ratio is a measure of the hydrogenation activity of a particular catalyst based on the quantitative conversion of the aromatic naphthalene rings to the partially saturated ring structure of tetralin (1,2,3,4-tetrahydronaphthalene).

EXAMPLE 1

A high surface area iron sulfide was prepared by sulfiding ferric oxide with hydrogen sulfide in the presence of hydrogen. The ferric oxide was red-anhydrous powder of over 99% purity and was obtained from Fisher Scientific Company. The hydrogen sulfide gas was of commercial purity obtained from Matheson Gas Company.

A porcelain boat containing 1.25 grams of ferric oxide was placed in the center of a one inch O.D. Pyrex tube which was then placed in an electric furnace. Rubber stoppers were installed in the inlet and outlet opening and hydrogen was passed through the furnace at a rate of 60 cc/min. $H_2S$ was then turned on and metered at a rate of 6 cc/min through the tube to give a $H_2/H_2S$ molar ratio of 10/1.

The furnace was then heated to 350° C. in a period from 50-70 minutes. Once the temperature reached 350° C., the heating was continued at that level for 150 minutes. At the end of the reaction period, the furnace was switched off and opened to permit rapid cooling. The product was removed from the furnace, and then ground up and stored for later use, in each case under an inert atmosphere ($N_2$).

The surface area was measured and found to be 5.34 m²/gram. The catalyst of this example was tested for naphthalene hydrogenation in the following manner. To a 13.5 ml autoclave was added 0.5 g of the catalyst of Example 1 plus 5.0 grams of a solution comprised of 0.5 grams of naphthalene in 4.5 g hexadecane. The reactor was pressured with hydrogen to 1250 psig at 25° C. It was then heated to 410° C. and held for 30 minutes, after which the reactor was cooled, opened and the sample removed. A gas chromatographic analysis showed a considerable yield of tetralin in the product. All subsequent naphthalene hydrogenation activities were measured by this method.

EXAMPLE 2

An iron sulfide material was prepared in a manner exactly as in Example 1 except the temperature of the furnace was brought to 410° C. and held for the 150 minute period. The surface area of the material prepared here was 3.10 m²/gram. The activity for hydrogenating naphthalene is 0.31 T/N.

EXAMPLE 3

A 1.25 gram sample of pyrite obtained from Fisher Scientific Company was placed in the porcelain boat used in Example 1. Hydrogen was passed over the sample at a rate of 60 cc/min. in the absence of any added $H_2S$. The sample was heated by the method described in Example 1 to a temperature of 410° C. The recovered sample had a surface area of 1.44 m²/gram. The activity for hydrogenating naphthalene is 0.56 T/N.

EXAMPLE 4

Another sample of the pyrite obtained from Fisher Scientific Company was treated in a manner identical to Example 3. The surface area of this material was 1.56 m²/gram. The activity of this sample for naphthalene hydrogenation was 0.19 T/N.

EXAMPLES 5-16

Ferric oxide, purchased from the Fisher Scientific Company, identical to the material used in Example 1, was treated with $H_2S$ in 1.25 gram batches in the manner described in Example 2 except for the following features:

1. The furnace treat temperature was varied.
2. The $H_2S$ treat rates were varied.
3. The samples, when removed from the furnace, were rigorously kept in an inert atmosphere before testing.

The materials, their particular treat temperatures, their surface areas, their $H_2S$ treat rates and their activities for hydrogenating naphthalene, are given in Table 1.

EXAMPLE 17

A sample of the catalyst of Example 15 was exposed to air at room temperature and atmospheric conditions on a bench top overnight. This material gave a significantly lower hydrogenation activity than did the catalyst of Example 15. The T/N ratio was 0.98 versus a similar value for Example 15 catalyst of 3.14.

EXAMPLES 18-20

Ferric oxide was treated in the manner described in Examples 5-16 except the $H_2S$ treatment at 6 cc/min was done in the absence of hydrogen at temperatures shown in Table 1. The catalyst of Example 20 was prepared in a manner identical to Example 19.

EXAMPLE 21

A sample of iron sulfide prepared by another method illustrates the importance of the method of preparation for the catalyst of this process. The catalyst of this example was prepared by mixing and stirring at room temperature 100 ml of a solution containing 20 grams of ferrous chloride plus 50-100 grams of ammonium sulfide solution, Baker and Adamson Quality, obtained from Allied Chemical Corporation, Morristown, New Jersey. After stirring for 30-60 minutes, the solid was filtered off and dried at 60° C. under flowing nitrogen for two hours. This material, when tested for hydrogenation of naphthalene, gave negligible reaction (T/N=0.02), although it had a high surface area of 11.8 m$^2$/g.

EXAMPLES 22-23

The starting materials used in Examples 1 and 2 were tested for reactivity for naphthalene hydrogenation.
Catalyst of Example 22—Fe$_2$O$_3$ (Example 1)
Catalyst of Example 23—FeS$_2$ (Example 2)
The activities are shown in Table 1.

EXAMPLES 24-27

Ferric oxide was treated in a manner as described in Examples 18-20 except that the H$_2$S treatment was at 10 cc/min. at the temperatures shown in Table 1. The activities are also shown in Table 1.

EXAMPLES 28-31

Ferric oxide was sulfided with H$_2$S in a porcelain boat wherein two to three grams of Fe$_2$O$_3$ were placed in 1-inch O.D. pyrex glass tube under a constant flow of nitrogen until the particular temperature shown in Table 1 was obtained. Then the nitrogen flow was switched off and hydrogen sulfide passed over the oxide sample at 10 cc/min. The sulfided samples were tested for tetralin/naphthalene hydrogenation activity as described in Example 1 with the resulting activity shown in Table 1.

EXAMPLES 32-37

Ferric oxide was sulfided and tested for tetralin/naphthalene conversion as in Examples 28-31 except that during the sulfiding of the iron oxide, 60 cc/min of H$_2$ and 6 cc/min of H$_2$S were used. The sulfided samples were tested for their T/N ratio as described in Example 1 with the resulting activity shown in Table 1.

The catalysts of this disclosure can be used for hydrogenating multi-ring aromatic materials such as are found in coal liquids. The hydrogenation of naphthalene is one illustration of that hydrogenation activity. The catalyst can be used in either a continuous or batch mode. In the continuous mode, the catalyst after being prepared can be slurried with the reactants and passed into a heated reactor. The slurry can be either preheated, if in a continuous mode, or it can be introduced into a vessel and then heated. Hydrogen gas can optionally be added to the batch vessel either by charging over the top of the fluid layer or by bubbling up through the fluid. The product can be separated from the slurry catalyst by decantation, filtration or by distillation. The solid phase can be either subjected to a regenerative step, recycled directly or discarded.

As shown by the examples, iron sulfide produced by the method of the present invention has particular activity for the hydrogenation of coal solvents, such as naphthalene. The data evidenced by the preceding examples indicates that the temperature at which the catalyst's preparation reaction is conducted is critical to the creation of a catalyst having high hydrogenation activity as exemplified by the tetralin/naphthalene ratio. This ratio is the rate of conversion of the fully aromatic naphthalene to the partially saturated tetralin. As shown by the data, the critical reaction temperature range is 260° C. to 315° C. where hydrogen is excluded from the catalyst preparation reaction. Optimally, the reaction is conducted at 275° C. It has been discovered that the catalyst preparation reaction should be conducted in an inert atmosphere in order to achieve the optimum result. This calls for the exclusion of oxidizing as well as reducing atmospheres. Surprisingly, the best catalysts are prepared in an atmosphere which is free of hydrogen gas. Alternately, the catalyst reaction can be conducted at 350° C. with hydrogen. Care should also be used in the maintenance of the catalyst after its production and prior to its utilization. Again, the data shows that exposure to other than inert atmospheres leads to a degradation of the catalytic activity of the catalyst of the present invention during storage. Therefore, the catalyst should be stored in an inert atmosphere prior to its introduction into the solvent hydrogenating reaction.

From the foregoing, it will be seen that the present invention provides a superior process for the conversion of coal into hydrocarbons at good yields. The conversion is conducted with the use of uniquely active iron sulfide catalysts which hydrogenate the coal solvent, and in turn, said solvent hydrogenates the coal itself. Therefore, the process involves an improved method utilizing inexpensive catalysts for the production of high yields of hydrocarbons from coal solids and liquids.

What is claimed is:

1. In a process for hydrogenating coal wherein a coal solvent is hydrogenated in the presence of a hydrogenation catalyst and that hydrogenated solvent in turn hydrogenates the coal, the improvement comprising carrying out the solvent hydrogenation in the presence of an iron sulfide catalyst of increased catalytic activity prepared by the reaction of ferric oxide with hydrogen sulfide within a temperature range of 260° to 315° C. in a non-oxidizing atmosphere.

2. The invention of claim 1 wherein the temperature of the catalyst preparation reaction is 275° C.

3. The invention of claim 1 or 2 wherein the catalyst preparation reaction in conducted in the absence of hydrogen.

4. The invention of claim 1 or 2 wherein the catalyst reaction product is stored in an inert atmosphere prior to use in a solvent hydrogenation reaction.

5. The invention of claim 1 or 2 wherein the hydrogenation reaction of the coal with the hydrogenated solvent is conducted in the presence of a hydrogen atmosphere.

6. In a process for hydrogenating coal wherein a coal solvent is hydrogenated in the presence of a hydrogenation catalyst and that hydrogenated solvent in turn hydrogenates the coal, the improvement comprising carrying out the solvent hydrogenation in the presence of an iron sulfide catalyst of increased catalytic activity prepared by the reaction of ferric oxide with hydrogen sulfide at a temperature of 350° C. in a hydrogen atmosphere.

* * * * *